Dec. 1, 1953  E. SCHULTHESS  2,661,026
OIL HOSE
Filed Nov. 9, 1948
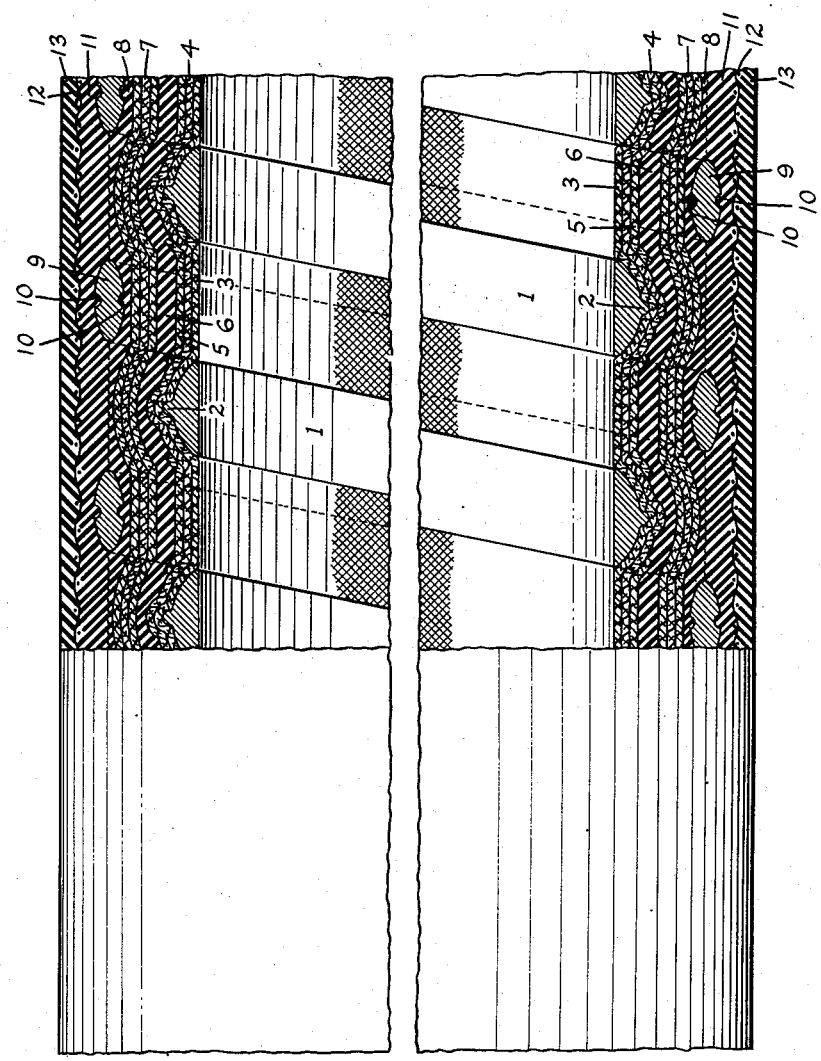
INVENTOR.
ERNEST SCHULTHESS
BY
ATTORNEY.

Patented Dec. 1, 1953

2,661,026

UNITED STATES PATENT OFFICE 2,661,026

OIL HOSE

Ernest Schulthess, South Orange, N. J.

Application November 9, 1948, Serial No. 59,112

2 Claims. (Cl. 138—59)

This invention relates to a construction of oil hose and more particularly to a combination oil suction and discharge hose for use, for example, with field tanks or reservoirs, oil tankers, etc.

In my Patent No. 1,810,032 dated June 16, 1931, I have disclosed a construction of oil hose which has been found in actual use to be highly desirable and effective as an oil suction and discharge hose. Hose used for this purpose is subjected to intense strain, particularly when employed in the discharge of oil from a tanker to a ship, due to the pulsating flow of oil under great pressure through the hose, which is accomplished while the hose is being constantly subjected to intense bending and longitudinal stresses due to the constant rise and fall of the ships relative to each other. It is extremely important that hose used for this purpose be capable of withstanding such usage for relatively long periods, both from the standpoint of the danger involved in the failure of such a hose, and the cost of such a failure both in time, material and money. It is accordingly the purpose of the present invention to provide an improved oil suction and discharge hose which embodies advantageous features of construction over such prior hose, such as will give it greater flexibility enabling it to have a far greater flexing radius than previously known hose of this type, and will make it more durable and capable of withstanding far greater distortion without excessive stress being applied to the structure, such as to cause permanent injury to the material.

A particular embodiment of my improved oil suction and discharge hose is illustrated in the accompanying drawing which shows a portion of the hose, partly in section. In this drawing, the numeral 1 designates a helix of wire forming the internal bracing member of the hose. As is clearly shown in the drawing, the wire helix includes a body portion whose cross sectional area is segment shaped; being preferably in the form of approximately a segment of a circle whose chord is shorter than its diameter. Suitable dimensions for such body portion of the wire helix are ¾" width and ₃₂"  thickness. Formed on the inner convex surface of the body portion of the wire helix is an external, longitudinally extending rib or bead 2 having a curved outer surface so that the wire helix in cross section is substantially keel-shaped. The bead 2 which is approximately ⅛" wide at its base and approximately ₁₆" thick, imparts greater strength to the wire helix and at the same time, provides a better anchorage of the wire helix against displacement so that the hose may be flexed or bent into a relatively short radius without danger of the wire helix becoming dislodged from its original position in the hose. During such flexure of the hose, even into extremely sharp bends, the hose structure on the exterior of the bend will move relative to the convex surface of the wire helix in a somewhat radial fashion on either side of the bead as a pivot with the wire helix remaining in a substantially fixed position relative to such movement of the hose structure. On the interior of such bend, the hose structure will become more firmly seated on the convex surface of the body of the wire helix, and thus through the bead 2, will become more firmly anchored in the hose structure. Thus with this form of wire helix, there is eliminated entirely any possibility of the wire helix becoming displaced or chafing the fabric which overlies it during flexure of the hose structure and the latter is permitted to flex in a natural way free from any undue strain. The form of the helix in which the wire 1 is wound is preferably such that the widths of the spaces between the coils of the wire helix are slightly greater than the width of the wire. For example, in a hose having a 7¾ inch outside diameter and having a ¾" wide wire helix, the width of the spaces between the coils of the helix should preferably be ⅞". It will be understood that the width of the spaces between the coils of the helix 1 will vary with the widths of the wire helix used in different hose.

Over the wire helix 1 is applied one ply 3 of straight or longitudinally cut extra strong fabric such as closely woven duck. The ply 3 is a single sheet having a longitudinal length as long as the hose and a width such that when it is wrapped around the wire helix 1, there is provided a longitudinally extending two inch wide overlap, which will be locked in position by the wire helix in the hose. Due to its longitudinal cut, the filler threads of ply 3 will be disposed in parallel relation with the axis of the hose. Overlying ply 3 is one or more plies 4 of strong bias-cut fabric such as closely woven duck. The bias-cut duck forming plies 4 is preferably impregnated with an oil resisting compound to prevent gasoline, oil or other liquids transmitted by the hose from percolating into the body structure of the hose. The bias-cut fabric plies 4 are formed from a three to four inch width strip which is wound helically, with a small overlap, over the wire helix 1 and ply 3 so that the fabric of such plies or strip 4 follow the contour of the helix snugly and is enabled to flex more naturally without undue strain; this corrugated formation of the plies 4 eliminating practically all the strain brought to bear by the wire helix 1. A strip 5 of fabric approximately one inch wide is then helically applied upon the fabric plies 4 so as to bridge the spaces between the wire helix 1. The fabric strip 5, besides adding strength to the hose, holds the fabric plies 3 and 4 in the helically-shaped space between the coils of the wire helix 1 and is an additional safeguard to prevent oils or other liquids transmitted through the hose from penetrating the hose structure to the oil and gasoline resisting rubber tube 6. The fabric strip 5 also has independent freedom of movement when the hose is flexed, thereby diminishing the creation or existence of strains in the hose structure.

Over the fabric ply 4 and strip 5 is placed an oil resisting cushion of rubber 6 which is of a thickness determined by the requirements as to service, particularly with respect to the pressures and stresses which the particular hose is designed to withstand. This oil resisting rubber cushion in the form of a tube, is applied over the ply 4 and strip 5 in a uniform thickness throughout the length of the hose. A number of plies 7 of strong, closely woven frictioned duck is next applied in a form corresponding with the corrugated effect produced by the wire helix 1 and superimposed layers of duck and oil resisting rubber. Upon this plurality of plies of duck 7 is then placed a second oil resisting rubber cushion 8 which preferably is also impregnated with a gasoline or oil resisting compound.

Over the second cushion 8 of oil resisting synthetic rubber and positioned intermediate the coils of wire helix 1 are the coils of a second wire helix 9 of substantially oval cross section and almost or approximately equal in width to the spaces between the coils of wire helix 1. Suitable dimensions for the wire helix 9 in a hose of the size illustrated in the drawing, would be ⅝″ width and ¼″ thickness. Provided in the inner and outer surfaces of the greater diameter or major axis of the helix are provided two oppositely disposed, longitudinally extending recesses or channels 10, 10, each having a width at their outer ends of approximately 3/32 of an inch and a depth of approximately from 1/16 to 3/32 of an inch. The inner recess or channel 10 in the wire helix 9 will become filled with rubber from the rubber cushion 8, as such helix is applied to the hose structure under heavy tension and the outer recess or channel 10 of wire helix 9 will become filled with rubber from the overlying rubber cushion 11. Thus, the channels 10, 10 by reason of their locking engagement with the two rubber cushions 8 and 11, will function in the nature of stabilizers or anchoring means, to prevent the coils of the wire helix 9 from becoming dislodged from the positions they are placed in the hose structure. The channels 10, 10 thus minimize the possibility of the hose becoming deformed during usage and consequently prolong its life. Due to the fact also that the helix 9 is so locked in embedded relation between two layers of rubber, the hose may be flexed into a smaller radius of bend than previously made hose of this type and without damage to its structure. The rubber cushion 11 is preferably made of an oil resisting rubber composition, and is applied over the rubber cushion 8 and the wire helix 9, so that it will have a substantially uniform outside diameter throughout its length with the outer surfaces of the wire helix 9 embedded to a depth of approximately 1/16″ by such rubber cushion.

Placed over the outer surface of the rubber cushion 11 is a single ply 12 of an open meshed fabric, such as leno fabric. The entire structure is then coated with a layer 13 of synthetic rubber made from the best available oil and gasoline resisting synthetic rubber compound to protect the understructure of the hose from such fluids and atmospheric oxidation, and from damage when the hose is dragged over sharp ends, as on docks, decks of ships or rough ground. As a result of the leno fabric ply 12, the outer coating or layer 13 of rubber, when the complete hose is vulcanized, will become united with the rubber cushion 11, the layers 8, 11, 12 and 13, after such step becoming in fact, a solid, inseparable mass of rubber and fabric. This solid mass of rubber and stretchable fabric will permit the whole hose structure to flex more freely than prior known hose structures of this type and at the same time, prevents any possibility of the penetration of oils or water into the structure of the hose or the separation of layers 8, 11, 12 and 13 from each other or from the underlying hose structure.

With regard to the under or inner hose structure, it will be noted that the cushion layer or tube 6 is preferably constituted of a synthetic rubber, which has been treated to make it oil and gasoline resistant. While cushion layer 6 in the hose assumes a corrugated form, it is made from rubber which is uniform in thickness throughout its length. The advantage of the corrugated form imparted to this tube 6 in the hose, is that it enables the tube to flex more naturally without undue strain and reduces the possibility of its rupturing under sharp bends. The rubber layer 6 also functions as a cushion for the fabric plies 3, 4 and 5, the wire helix 1 and the plies of fabric 7. The plies 7 are preferably constructed of strong bias-cut fabric which form the main fabric support of the hose structure and are applied in a corrugated manner to enable such plies to stretch naturally without strain as the hose is flexed. This corrugated structure of fabric, which is cushioned by the corrugated oil resisting synthetic rubber tube 6 and the corrugated oil resisting cushion 8, produces unusual strength to withstand heavy pressures and sharp bends.

It will also be noted that in the disclosed hose structure, the rubber layer 8 together with the rubber layer 11 also cushions the movements of the wire helix 9. By reason of the special design of the wire helix 9, great strength is added to the hose and it provides a powerful protection for the main structure of the hose. The two recesses or channels 10, 10 in such wire helix provide a secure anchorage of such helix to the rubber cushions 8 and 11, thereby permitting a shorter flexing radius for the main structure of the hose without any possible distortion or shifting of the coils of such helix from their original places during such flexing.

Having described and illustrated a preferred embodiment of my invention, what I claim is:

1. In a construction of oil hose, a helical liner of wire having its convolutions spaced from one another, said wire being segment-shaped in cross-section and being provided on its outer curved surface with a longitudinally extending, outwardly projecting bead extending transversely of the length of the hose in helical fashion, a plurality of plies of fabric hose material engaging the outer surfaces of said liner and covering said liner and occupying the spaces between the convolutions of the liner so as to form with said liner the inner wall of the hose, said liner being seated in a helically-shaped groove formed in said fabric hose material, and the bead on said liner being seated in a correspondingly-shaped reduced portion of such groove located outwardly of the body of the liner and anchoring said liner against displacement relative to said fabric hose material during bending of the hose while in use, a layer of rubber overlying said fabric hose material and forming a continuous coating of rubber on the hose, a helix of wire overlying and engaging said layer of rubber and having its convolutions positioned intermediate the convolutions of said liner wire, and a second layer of rubber overlying said first rubber layer and said helix of wire, said second layer of rubber forming a continuous coating of rubber on the hose and engaging with said first layer of rubber except where separated by said helix of wire so that the latter is wholly embedded in rubber material, said helix of wire being of substantially oval cross-section and being provided on its inner and outer surfaces with longitudinally extending channels extending transversely of the length of the hose in helical fashion, the material of the rubber layers underlying and overlying said helix of wire being seated in said channels to anchor said helix of wire between said rubber layers and to interlock the same together.

2. In a construction of oil hose, a helical liner of wire having its convolutions spaced from one another, said wire being segment-shaped in cross-section and being provided on its outer curved surface with a longitudinally extending, outwardly projecting bead extending transversely of the length of the hose in helical fashion, a plurality of plies of fabric hose material engaging the outer surfaces of said liner and covering said liner and occupying the spaces between the convolutions of the liner so as to form with said liner the inner wall of the hose, said liner being seated in a helically-shaped groove formed in said fabric hose material and the bead on said liner being seated in a correspondingly-shaped reduced portion of such groove located outwardly of the body of the liner and anchoring said liner against displacement relative to said fabric hose material during bending of the hose while in use, alternate layers of rubber and fabric hose material overlying said plurality of plies of fabric hose material, all of said fabric and rubber layers having a spiral-shaped corrugated form produced by said helical liner, a cushioning layer of rubber overlying said corrugated layers and forming a continuous coating of rubber on the hose, a helix of wire overlying and engaging said layer of rubber and having its convolutions positioned intermediate the convolutions of said liner wire, and a second cushioning layer of rubber overlying said first rubber layer and said helix of wire, said second layer of rubber forming a continuous coating of rubber on the hose and engaging with said first layer of rubber except where separated by said helix of wire so that the latter is wholly embedded in rubber material, said helix of wire being of substantially oval cross-section and being provided on its inner and outer surfaces with longitudinally extending channels extending transversely of the length of the hose in helical fashion, the material of the rubber layers underlying and overlying said helix of wire being seated in said channels to anchor said helix of wire between said layers and to interlock the same together, said first cushioning layer of rubber material having an inner surface conforming to the corrugated exterior surface of said alternate layers and the combined thickness of the rubber material of said cushioning layers being such that the outer surface of said second cushioning layer of rubber is of substantially uniform diameter.

ERNEST SCHULTHESS.

References Cited in the file of this patent

UNITED STATES PATENTS

| Number | Name | Date |
|---|---|---|
| 204,368 | Petchell | May 28, 1878 |
| 1,810,032 | Schulthess | June 16, 1931 |
| 2,277,786 | Schulthess | Mar. 31, 1942 |
| 2,600,220 | Doelker et al. | June 10, 1952 |